(12) United States Patent
Kim

(10) Patent No.: US 11,573,820 B2
(45) Date of Patent: Feb. 7, 2023

(54) SYSTEMS AND METHODS FOR CENTRALIZATION OF SERVER INITIALIZATION INFORMATION

(71) Applicant: Coupang Corp., Seoul (KR)

(72) Inventor: Tae Kyung Kim, Seoul (KR)

(73) Assignee: COUPANG CORP., Seoul (KR)

( * ) Notice: Subject to any disclaimer, the term of this patent is extended or adjusted under 35 U.S.C. 154(b) by 134 days.

(21) Appl. No.: 17/240,642

(22) Filed: Apr. 26, 2021

(65) Prior Publication Data

US 2021/0240515 A1 Aug. 5, 2021

Related U.S. Application Data

(63) Continuation of application No. 16/777,591, filed on Jan. 30, 2020, now Pat. No. 11,016,799.

(51) Int. Cl.
*G06F 9/455* (2018.01)
*G06F 16/22* (2019.01)
*G06F 16/23* (2019.01)

(52) U.S. Cl.
CPC ...... *G06F 9/45558* (2013.01); *G06F 16/2272* (2019.01); *G06F 16/2379* (2019.01);
(Continued)

(58) Field of Classification Search
CPC .................................................. G06F 9/45558
See application file for complete search history.

(56) References Cited

U.S. PATENT DOCUMENTS 10,534,629 B1 1/2020 St. Pierre et al.
10,880,312 B1 * 12/2020 Mesard ................... H04L 63/08
(Continued)

FOREIGN PATENT DOCUMENTS

CN 103701920 A 4/2014
CN 103957237 A 7/2014
(Continued)

OTHER PUBLICATIONS

Office Action dated Sep. 7, 2021, in counterpart Taiwanese Patent Application No. 109146241 (60 pages).
(Continued)

*Primary Examiner* — Sisley N Kim
(74) *Attorney, Agent, or Firm* — Finnegan, Henderson, Farabow, Garrett & Dunner, LLP

(57) ABSTRACT

Methods and systems for resource usage tracking are disclosed. In one embodiment, an exemplary method comprises maintaining, in a data store, a configuration file associated with a virtual server instance; instantiating a virtual server based on the virtual server instance by: locating, in the data store, the configuration file; determining required virtual server resources based on the contents of the configuration file; configuring at least one resource of the virtual server based on the contents of the configuration file; and spinning up the virtual server. The method may also comprise determining that an instantiated virtual server has reached an error state; and based on the determination that the instantiated virtual server has reached an error state, determining a configuration file associated with the instantiated virtual server; and instantiating a new virtual server using the determined configuration file.

20 Claims, 4 Drawing Sheets

(52) U.S. Cl.
CPC ............ *G06F 2009/4557* (2013.01); *G06F 2009/45575* (2013.01); *G06F 2009/45595* (2013.01)

(56) References Cited

U.S. PATENT DOCUMENTS

| | | | |
|---|---|---|---|
| 2009/0241030 A1* | 9/2009 | von Eicken | H04L 67/00 |
| | | | 715/735 |
| 2013/0013732 A1 | 1/2013 | Machida | |
| 2013/0290542 A1 | 10/2013 | Watt et al. | |
| 2013/0346568 A1 | 12/2013 | Forsman et al. | |
| 2014/0115578 A1 | 4/2014 | Cooper et al. | |
| 2014/0317625 A1 | 10/2014 | Ichikawa et al. | |
| 2015/0006730 A1* | 1/2015 | Helfman | G06F 9/5077 |
| | | | 709/226 |
| 2017/0104782 A1* | 4/2017 | Folco | H04L 63/1433 |
| 2017/0339250 A1 | 11/2017 | Momchilov et al. | |

FOREIGN PATENT DOCUMENTS

| | | |
|---|---|---|
| JP | 2013-196424 | 9/2013 |
| KR | 10-2016-0070726 | 6/2016 |
| KR | 10-1906912 | 12/2018 |
| TW | 201928707 A | 7/2019 |

OTHER PUBLICATIONS

Examination Notice dated Feb. 15, 2022 in counterpart Hong King Application No. 22020022249.9 (4 pages).

Notice of Preliminary Rejection issued Korean Patent Application No. 10-2020-0055321 dated May 4, 2021, (9 pgs).

International Search Report and Written Opinion in counterpart Application No. PCDT/IB2020/060909 dated May 25, 2021 (8 pages).

* cited by examiner

SYSTEMS AND METHODS FOR CENTRALIZATION OF SERVER INITIALIZATION INFORMATION

CROSS-REFERENCE TO RELATED APPLICATIONS

This application is a continuation of U.S. patent application Ser. No. 16/777,591, filed Jan. 30, 2020, currently pending and allowed, the disclosure of which is expressly incorporated herein by reference in its entirety.

TECHNICAL FIELD

The present disclosure generally relates to computerized systems and methods for centralization of server initialization information. In particular, embodiments of the present disclosure relate to a system that maintains a configuration file associated with a virtual server instance. The system instantiates virtual servers by determining resources required of a virtual server from the configuration file, and configures the virtual server to provide the required resources. In this way, a single configuration management database may quickly instantiate multiple copies or clones of virtual servers to improve performance or storage, or to recover from server failure or inefficiency.

BACKGROUND

Proliferation of virtual servers has broadened access to large computing resources at low costs. Various corporations provide virtual server resources, also known as cloud computing. Further, companies, universities, and government organizations utilize virtual servers to host websites, perform complex computer simulations, and store large databases, among other services. Virtual servers provide secure, reliable, and scalable computational resources to clients, enabling clients to focus on creating products rather than maintaining server capability.

However, complex organizations consuming large amounts of virtual server resources often have difficulty tracking many different configurations of the virtual servers. For instance, a large company may have many different operations, each requiring different virtual server resources and configurations. A management department may require storage on a virtual server, while research and development require processing for computational modeling, and a sales department may need a virtual server to host a web site.

Further, organizations sometimes require redundancy in virtual servers. For example, a database of important health or financial information may require double or triple redundancy to protect against hardware failures or power outages. Additionally, when a virtual server does fail or otherwise become unavailable, organizations must dedicate significant time to reestablishing the same operations on a new virtual server. For organizations with many virtual servers, maintaining virtual server operation requires frequent configuration of new virtual servers. However, maintaining many different configurations for many different roles could introduce errors and inconsistencies. For example, if a virtual server fails, an employee configuring a new virtual server to perform the role of the failed server may accidentally forget a configuration setting, disrupting access to the server resources for clients and users.

Additionally, large organizations may need to scale virtual server resources quickly, for instance, if an e-commerce website is conducting a sale, or a research and development firm is running a short term but resource intensive computer model. The requirement of configuring many virtual servers impairs scalability and increases costs.

Accordingly, there is a need for systems and methods to manage virtual servers and centralize server initialization information.

SUMMARY

One aspect of the present disclosure is directed to a computer-implemented system for virtual server management. The system comprises a memory storing instructions and at least one processor configured to execute the instructions to: maintain, in a data store, a configuration file associated with a virtual server instance; and instantiate a virtual server based on the virtual server instance by: locating, in the data store, the configuration file; determining required virtual server resources based on the contents of the configuration file; configuring at least one resource of the virtual server based on the contents of the configuration file; and spinning up the virtual server.

Another aspect of the present disclosure is directed to a computer-implemented method for virtual server management. The method includes the steps of: maintaining, in a data store, a configuration file associated with a virtual server instance; and instantiating a virtual server based on the virtual server instance by: locating, in the data store, the configuration file; determining required virtual server resources based on the contents of the configuration file; configuring at least one resource of the virtual server based on the contents of the configuration file; and spinning up the virtual server.

Another aspect of the present disclosure is directed to a computer-implemented system for virtual server management. The system comprises a memory storing instructions and at least one processor configured to execute the instructions to: maintain, in a data store, a configuration file associated with a virtual server instance, the configuration file comprising a list of services for loading; determine an efficiency metric associated with an instantiated virtual server; terminate access to the virtual server when the efficiency metric is beneath a threshold; and instantiate a new virtual server based on the virtual server instance by: locating, in the data store, the configuration file; determining required virtual server resources based on the contents of the configuration file; configuring at least one resource of the virtual server based on the contents of the configuration file; and spinning up the virtual server.

Other systems, methods, and computer-readable media are also discussed herein.

DETAILED DESCRIPTION

Figure 1:
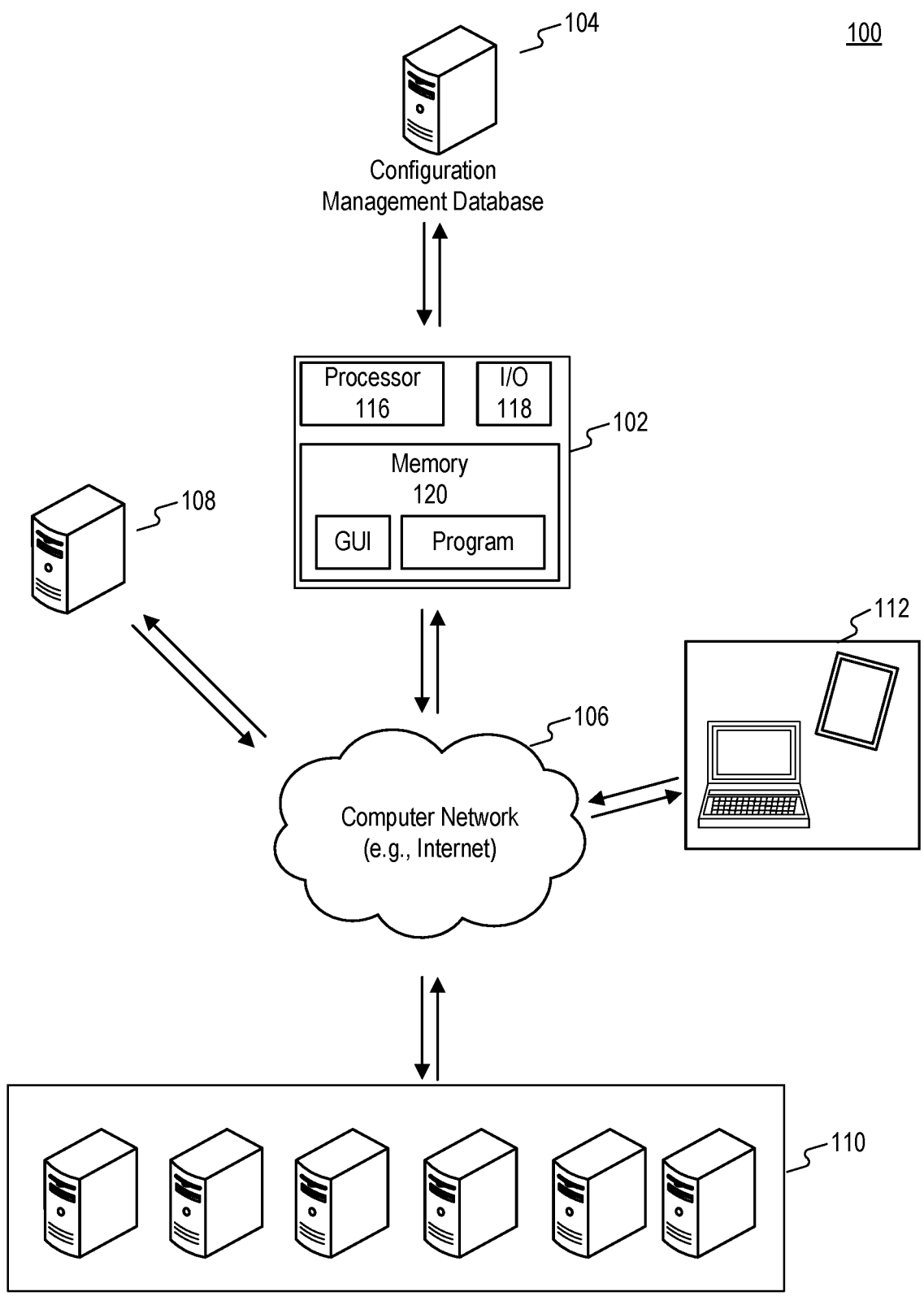
FIG. 1 illustrates a network including a client and virtual servers, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for virtual server management.

FIG. 1 shows a network 100 including a virtual server resource usage metric grading system 102. System 102 includes at least one processor 116, an input/output (I/O) device that allows data to be transmitted 118, and at least one memory 120. The memory 120 stores a program for operating the IP categorization module. The memory 120 may also store instructions for a graphical user interface (GUI).

Furthermore, processor 116 may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type of circuit capable of data processing. The processor may also be a virtual processor that includes one or more processors distributed across multiple machines or devices coupled via a network.

Additionally, the memory 120 may be a generic or specific electronic device capable of storing codes and data accessible by the processor (e.g., via a bus, not shown). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes may include an operating system (OS) and one or more application programs (or "apps") for specific tasks. The memory may also be a virtual memory that includes one or more memories distributed across multiple machines or devices coupled via a network.

System 102 is connected to a configuration management database (CMDB) 104. CMDB 104 may comprise a processor, I/O device, and memory. The memory of CMDB 104 may store configuration files for initializing virtual servers, such as necessary resource allocations including processor speeds and memory, stored variables, connection parameters including ports and IP addresses. CMDB 104 also may store user requests corresponding to roles for virtual server resources. In some embodiments, system 102 may concurrently operate as CMDB 104.

System 102 is connected to a computer network 106. For example, computer network 106 may include any combination of any number of the Internet, an Intranet, a Local-Area Network (LAN), a Wide-Area Network (WAN), a Metropolitan-Area Network (MAN), a virtual private network (VPN), a wireless network (e.g., compliant with the IEEE 802.11a/b/g/n), a wired network, a leased line, a cellular data network, and a network using Bluetooth connections, infrared connections, or Near-Field Communication (NFC) connections.

System 102 is further connected, either directly or via computer network 106, to client device 108. Client device 108 may be a laptop, standalone computer, mobile phone, and the like. A user may send virtual server resource requests through client device 108 to system 102. In some embodiments, system 102 may include client device 108 so that a single unit receives user requests and creates and stores configuration files. Alternatively, system 102 and client device 108 may be directly connected such that information exchanged between client device 108 and system 102 need not pass over computer network 106.

Additionally, system 102 communicates with virtual server provider 110. Provider 110 may, for instance, be a service operating a plurality of servers or general purpose computers, such as a server farm, which are available for rent or purchase. In some embodiments, provider 110 may charge a user for processing time, processor capability, storage, or connectivity, such as bandwidth. Provider 110 may also charge users a set baseline for connection to virtual servers, regardless of level of use, as a retainer to guarantee future access. Provider 110 may have servers and computers of varying capabilities, and may sell systems to users while charging maintenance fees. Other arrangements selling virtual server resources by provider 110 are possible as well.

In some embodiments, customer devices 112 may connect to services hosted by virtual servers of provider 110 via network 106. For example, a company may use servers operated by provider 110 to host an e-commerce website. Customer devices 112 may then connect to the e-commerce website via network 106. In this way, customers may access a company's website without directly accessing computers owned by the company, and instead interact with virtual servers operated by provider 110. This may provide a company with the convenience of not having organic employees to operate servers, and reduce costs by only paying for the amount of computing power the company needs. Alternatively, customer devices 112 may be research collaborators, for instance, who are able to share common data stored by the virtual servers of provider 110 or computing power without operating large server farms.

Figure 2:
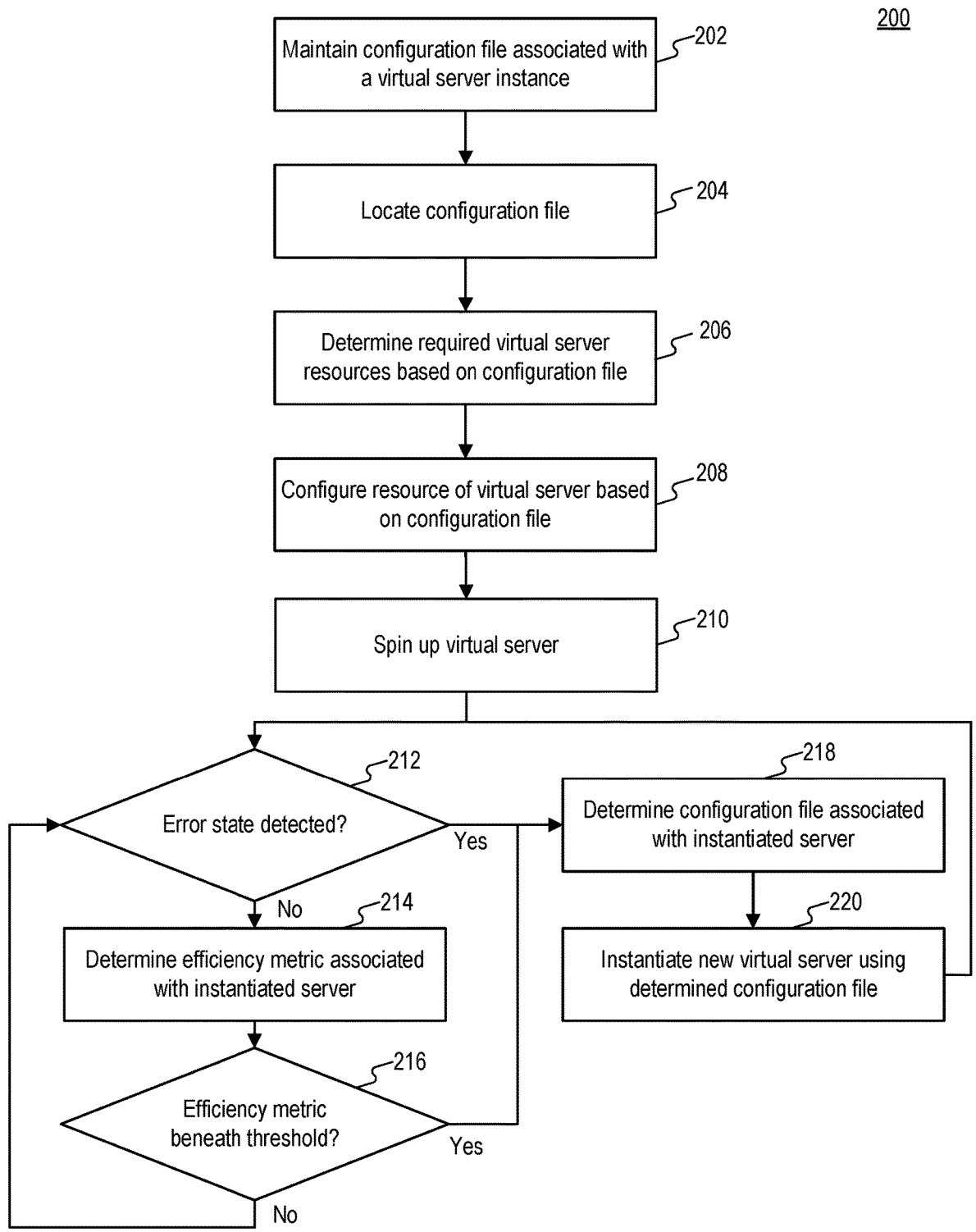
FIG. 2 is a flowchart of a virtual server management process, consistent with the disclosed embodiments.

FIG. 2 shows steps of virtual server management process 200. System 102 may perform virtual server management process 200. Instructions for performing virtual server management process 200 may be stored on memory 120 and implemented by processor 116 of system 102. Virtual server management process 200 includes the following steps.

At step 202, system 102 maintains, in a data store, a configuration file associated with a virtual server instance. System 102 may maintain the configuration file in memory 120, CMDB 104, or on one of virtual servers of provider 110. System 102 may store a plurality of configuration files for a plurality of roles. The files may be stored in text format, a SQL database, or the like. For example, the configuration file may include a list of storage volumes for mounting, such as an IP address, a MAC address, or a directory where a storage volume may be found. The storage volume may also be located on a virtual server, and the configuration file may provide an identifier of the virtual server and a path for the storage volume, for instance. The configuration file associated with the virtual server instance may also include a list of services for loading, such as programs, VPN information, or communication protocols. The configuration file may also include a list of environmental variables for loading, such as IP addresses, role names, user identifiers, or a unique identifier for the virtual server to enable further analysis of virtual server performance by system 102. In some embodiments, such as when a research and development organization is performing computer modeling, the configuration file may also include values of scientific constants. If an organization is using storage of a virtual server to store archived emails, the environmental variables may include lists of usernames and password to enable users to access archives. Additional information and metadata may also be stored in configuration files.

System 102 may then instantiate a virtual server based on the virtual server instance corresponding to the configuration file. At step 204, system 102 locates, in the data store, the configuration file. This may occur on demand, for instance, when an administrator initiates the request to instantiate a new virtual server, or automatically, as will be described later. Additionally, a user may trigger a new virtual server to be instantiated by requesting a new virtual server resource. For example, a user may create new role for a virtual server using client device 108. The user may provide details about the required virtual server resources, such as specifying that the role requires cache memory, storage memory, processing time, processing capacity, or network capacity, and further specify quantities of each resource needed, and if the resource is needed.

In some embodiments, an organization may have a template resource requirement for various roles so that a user can specify a role without providing technical details. Further, these templates may be stored as configuration files by system 102. For example, a graphic designer user in an e-commerce organization may wish to create a new product site. Using client device 108, the user may communicate to system 102 that a new website will be created. System 102 may locate a configuration file for creating a virtual server to host a new website. The file may provide communication protocols, resource requirements, templated graphics, and other organization standards for uniformity. The user may then begin designing the new product site to be hosted on the virtual server, with system 102 configuring the virtual server. Further, errors in configuration that could increase cost and slow performance are eliminated because a standard configuration file may be used that is created by trained engineers.

At step 206, system 102 determines required virtual server resources based on the contents of the configuration file. The configuration file may include a list of required virtual server resources, and step 206 may include copying the list of resources. Alternatively, system 102 may determine which resources are required based on information in the configuration file. For example, if the configuration file contains ports and IP addresses, system 102 may determine that the role requires connectivity resources from the virtual server.

At step 208, system 102 configures at least one resource of the virtual server based on the contents of the configuration file. System 102 may configure the resource by uploading data, variables, and software onto the virtual server. System 102 may also input communication addresses and protocols into the virtual server connection settings. In some embodiments, system 102 may communicate with the virtual server over network 106 using an API to communicate settings expected by the virtual server. System 102 may also use an automated web browsing software to automatically transfer information to virtual server using a website of provider 110. System 102 may also configure multiple resources of a single or multiple virtual servers if the configuration file indicates that multiple servers are required. System 102 may also determine if multiple virtual servers are required based on the configuration file. For example, if the configuration file indicates that a role requires 100 terabytes of storage, system 102 may configure storage from two virtual servers if virtual server storage is limited to 50 terabytes.

At step 210, system 102 spins up the virtual server. Step 210 may include communicating with other virtual or hardware servers to provide an identifier and address of the new virtual server to enable communication between old servers and new servers, thereby ensuring continuous operation of a role. Further, system 102 may delay spinning up the server after configuring the virtual server resource, for example, to conduct performance tests of the new virtual server or to ensure that virtual servers are all configured before spinning them up.

At step 212, system 102 determines if an instantiated virtual server has reached an error state. The instantiated virtual server may itself report an error state, such as a hardware failure or a communication error, via a notification such as email or through an API. Alternatively, system 102 may be configured to test virtual server performance periodically in order to determine if the virtual server has reached an error state. Further, system 102 may determine the severity of the error state and attempt to repair the virtual server. For example, if the error state is caused by a misapplied communication setting, such as an incorrect IP address caused by, for instance, corrupted data or a new required IP address, system 102 may attempt to reconfigure the virtual server to correct the communication error. If system 102 determines that an instantiated virtual server has not reached an error state, or if system 102 determines that an instantiated virtual server has reached a repairable error state, step 212 is NO, and system 102 proceeds to step 214.

At step 214, system 102 determines an efficiency metric associated with an instantiated virtual server. The efficiency metric may be a cost or speed per operation, storage, or connectivity, for example. At step 216, system 102 determines if the efficiency metric is beneath a threshold. If the efficiency metric not beneath a threshold, step 216 is NO, and system 102 returns to step 212 to continue monitoring for error states or efficiency metrics beneath a threshold. In some embodiments, system 102 may also wait before checking for an error state to limit status requests and processing.

If either of step 212 or 216 are YES, such that an error state is detected or an efficiency metric is beneath a threshold, system 102 proceeds to step 218 and determines a configuration file associated with the instantiated virtual server. In some embodiments, system 102 may also terminate access to the virtual server when the efficiency metric is beneath a threshold. System 102 may determine a configuration file by matching a role identifier to a role identifier contained in the configuration file, for instance. System 102 may also determine a configuration file by matching resources or configurations of the failed or inefficient virtual server to stored configuration files. In some embodiments, system 102 may skip to step 218 without an error or inefficiency. For example, a user may determine that a new setting needs to be applied to and standardized among multiple virtual servers. The user may force system 102 to jump to step 218 and determine a new configuration file without a virtual server failing or becoming inefficient at steps 212 and 216.

Once system 102 has determined a configuration file associated with the instantiated virtual server, system 102, at step 220, instantiates a new virtual server using the determined configuration file. System 102 may instantiate a plurality of virtual servers to replace the functionality of a single failed virtual server or to establish redundancy. System 102 may allow the failed or inefficient server to continue functioning, although at a degraded capability, until a new virtual server is instantiated to replace the lost functionality. System 102 may additionally provide an indication to a user of the error or inefficiency and wait for user approval before instantiating a new virtual server at step 220.

Further, after system 102 instantiates a new virtual server at step 220, system 102 returns to step 212 to monitor for an error state or inefficiency in the new virtual server at steps 212 through 216. System 102 may concurrently monitor a plurality of virtual servers performing various roles belonging to an organization.

Figure 3:
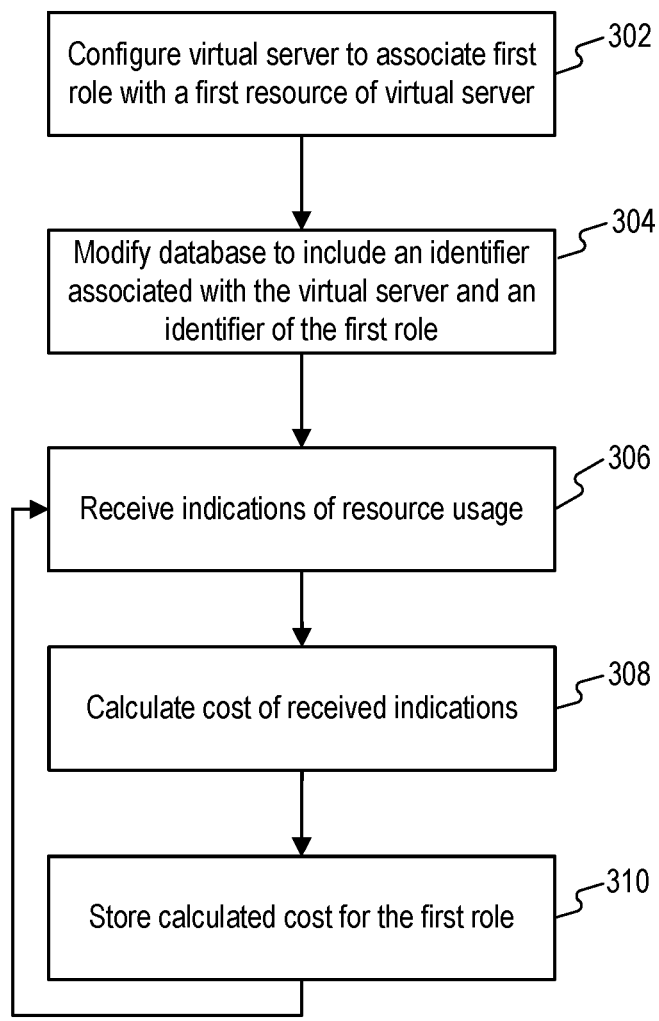
FIG. 3 is a flowchart of a virtual server cost storage process, consistent with the disclosed embodiments.

FIG. 3 shows steps of virtual server cost storage process 300. System 102 may perform virtual server cost storage process 300. Instructions for performing the virtual server cost storage process 300 may be stored on memory 120 and implemented by processor 116 of system 102. Virtual server cost storage process 300 includes the following steps.

At step 302, system 102 configures the virtual server to associate a first role with at least one resource of the virtual server. Associating a role with a resource may require system 102 (or the virtual server) to retrieve data, such as IP addresses and ports, from CMDB 104. Alternatively, software, code, initialization data or parameters, or digital assets may be copied from CMDB 104 or another storage and provided to the virtual server. System 102 may determine which resources are needed for the virtual server. The virtual server, on the other hand, may determine the needed resources based on the role contained in the request.

At step 304, system 102 modifies a database to include an identifier associated with the virtual server and an identifier of the first role assigned to the virtual server. The database may be, for instance, CMDB 104, memory 120, or stored on a virtual server. The database may record the virtual server identifier and the first role identifier in a SQL database, for example. Provider 110 may provide a unique identifier for the virtual server hosting the resource, such as an alphanumeric code, MAC address, IP address, or geophysical location including, for instance, a server warehouse location and server stack location within the warehouse. The virtual server identifier may also specify the resource of the virtual server performing the role.

At step 306, system 102 receives, a plurality of indications of resource usage associated with the identifier of the first role. The indications may be power consumption, processing duration, processor operations, bandwidth usage, storage, and the like. Further, the indications may include a cost per unit, such as cents per hour, cents per execution, or cents per floating point operation. The indications may comprise a cost per unit per time, such as cents per terabyte per month. Alternatively, cost per unit may be obtained separately from the indications of first resource usage. In some embodiments, the indications may further include information identifying the specific virtual server or account consuming the virtual server resource. The indications may be provided by an Application Programming Interface (API) operated by provider 110 or directly by the virtual server.

In some embodiments, received indications do not include virtual server identifiers. System 102 may then determine virtual server identifiers by matching resource usage to other information from provider 110. For example, received indications may only contain a list of usage, such as 23 terabytes, 29 terabytes, 51 terabytes, and 81 terabytes of storage for a month. System 102 may access a provider website in an additional step to determine, for instance, which virtual server stored 23 terabytes during the month, thereby obtaining a virtual server identifier to enable mapping to the first role.

After comparing the resource usage to the database or other resources, such as provider information, system 102 may determine that a second resource is not associated with any role and terminate access. For example, system 102 may receive indication of five hours of processing time costing $0.20 and no virtual server identifier. After analyzing the provider information, system 102 may determine that the virtual server responsible for the $0.20 charge was not attached to any role in the database and automatically terminate access to the server. As a further illustration, system 102 may receive an indication of 2 terabytes of storage for a virtual server with identifier A623g.6. System 102 may search the database for a server having identifier A623g.6 but find no associated role, indicating, for instance, that a user had ceased the role and no longer requires the resource. System 102 may then terminate automatically. In some embodiments, system 102 may automatically reassign a different role to the virtual server resource having no associated role, or flag the unassociated resource for reassignment by a user.

At step 308, system 102 calculates a cost of the received indications. This may include, for example, multiplying cost rates by resource consumption. System 102 may also include baseline rates that do not scale with usage, such as a monthly access fee for a virtual server. Further, system 102 may combine costs associated with a plurality of indications for a plurality of resources corresponding to a single role. For example, a role may require processing and storage from four virtual servers. A total cost for the role may be calculated as the sum of the individual virtual server costs. Further, a single virtual server may provide resources for a plurality of roles. For instance, a single virtual server may provide storage for roles A and B, and processing for role A. System 102 may also calculate a total cost of the virtual server.

At step 310, system 102 stores, in a data store, the calculated cost for the first role. System 102 may analyze historical costs of a virtual sever saved in the data store. The data store may be CMDB 104, or a virtual server. Further, system 102 may determine a cost efficiency at step 216 of process 200 as, for example, a cost per processing time, and a threshold based on historical cost efficiency. For instance, a virtual server may have a historical cost of $10 per month for processing resources for a neural network training role. If the virtual server later costs $20 in a month to perform the same role, the cost efficiency of the server may decrease, causing step 216 to be YES and resulting in system 102 instantiating a new virtual server. The threshold may be based on a deviation from historical absolute cost or cost efficiency.

Figure 4:
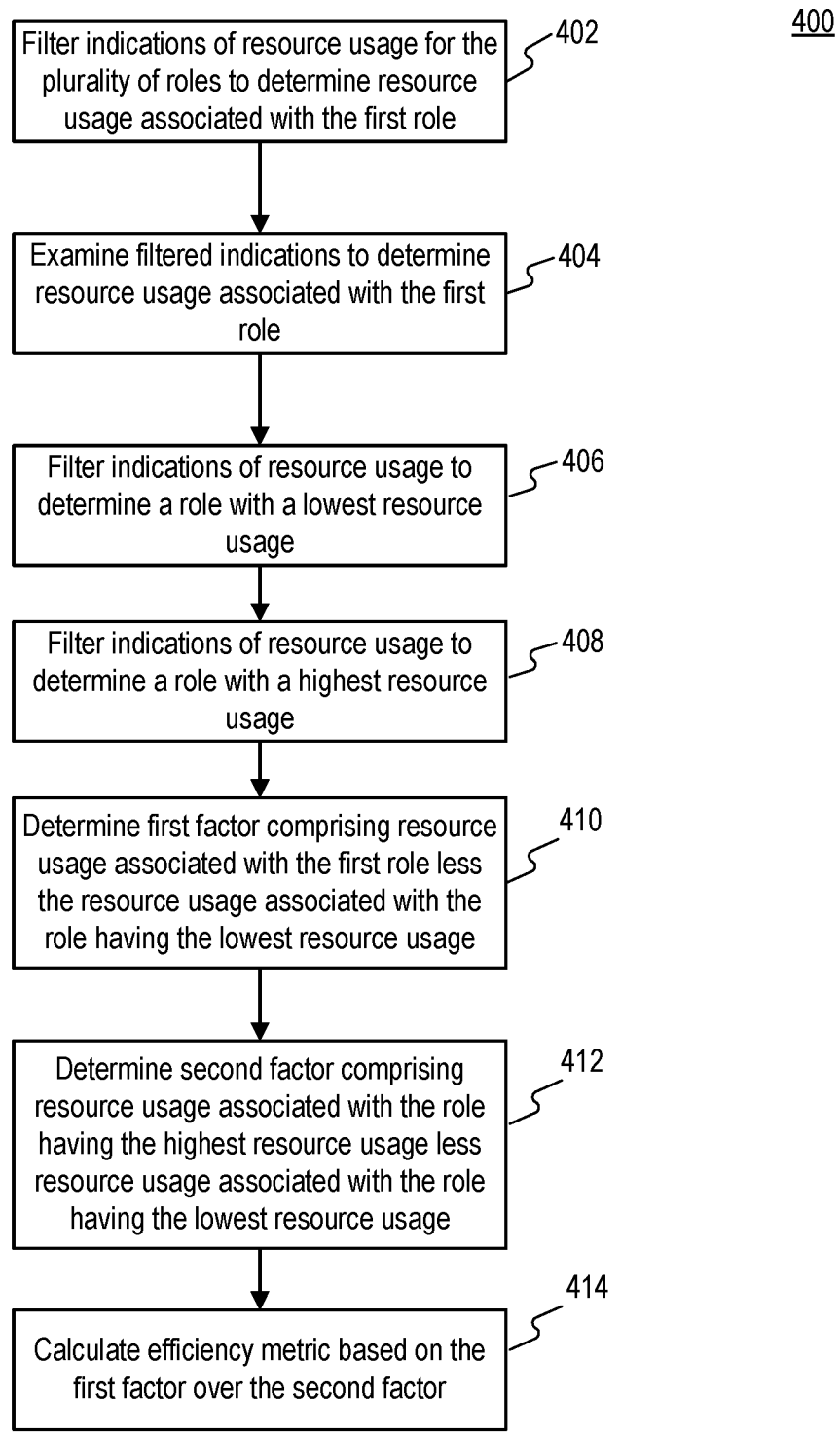
FIG. 4 is a flowchart of a flowchart of a resource usage metric calculation process, consistent with the disclosed embodiments.

FIG. 4 shows steps of an efficiency metric calculation process 400. In some embodiments, system 102 may perform process 400 to determine efficiency metric values in conjunction with step 214 of process 200. In other embodiments, system 102 may perform process 400 continuously or at any time (including on demand). Process 400 includes the following steps.

At step 402, system 102 filters the received indications of resource usage for the plurality of roles to determine resource usage associated with the first role. System 102 may filter received indications by virtual server identifier, resource, or associated role, for example. At step 404, system 102 examines the filtered indications to determine resource usage associated with the first role. System 102 may aggregate usage over a period of time, virtual servers, or providers, for instance, to determine the total resource usage associated with the first role. In some embodiments, the indications may be incorporated into various data structures to facilitate filtering and aggregating. For instance, the data may be converted into a SQL database prior to process 400.

At step 406, system 102 filters the received indications of resource usage to determine a role with a lowest resource usage, and, at step 408, filters the received indications of resource usage to determine a role with a highest resource usage. Steps 406 and 408 may further include an aggregation step to determine total usage over a period of time for each of the roles to determine the overall lowest and highest resource using roles.

At step 410, system 102 determines a first factor comprising the resource usage associated with the first role less the resource usage associated with the role having the lowest resource usage. In other words, system 102 determines a difference between the resource usage of the first role and the lowest resource usage among all of the roles. Further, at step 412, system 102 determines a second factor comprising the resource usage associated with the role having the highest resource usage less the resource usage associated with the role having the lowest resource usage. In this manner, system 102 determines the range of resource usage for the roles being analyzed.

At step 414, system 102 calculates an efficiency metric based on the first factor over the second factor. For example, the highest resource using role may have an efficiency metric of 1, and the lowest resource using role may have an efficiency metric of 0. The remaining roles may then have an efficiency metric ranging from 0 to 1. However, this example is provided for illustration, and efficiency metrics may have any range, such as 0 to 100.

In some embodiments, system 102 may use variations of steps 410 through 414 to further analyze or normalize indications of resource usage as part of calculating efficiency metrics. Additionally, different variations may be used for different resources. For example, system 102 may determine a processor efficiency metric reflecting the average CPU usage per week. System 102 may determine a first factor based on the natural logarithm of processor usage associated with the first role less the natural logarithm of processor usage associated with a role having the lowest processor usage. System 102 may also determine a second factor based on the natural logarithm of processor usage associated with a role having the highest resource usage less the natural logarithm of processor usage associated with the role having the lowest processor usage. System 102 may calculate processor efficiency for a role based on the first factor over the second factor.

System 102 may also determine a network efficiency metric reflecting the network ratio of number of bytes processed or transferred per each unit currency for a week. System 102 may determine a first factor based on the natural logarithm of a network ratio associated with the first role less the natural logarithm of a network ratio associated with a role having the lowest processor usage. System 102 may also determine a second factor based on the natural logarithm of processor usage associated with a role having the highest resource usage less the natural logarithm of processor usage associated with the role having the lowest processor usage. System 102 may calculate a processor efficiency metric based on the first factor over the second factor.

System 102 may also calculate a memory efficiency metric in a similar manner, based on, for example, average memory usage per week.

After calculating an efficiency metric using process 400, system 102 may determine if the efficiency metric value is beneath a threshold at step 216 of process 200. The threshold may be based on organizational standards or historical efficiency metric values, for example.

As an exemplary embodiment of the present disclosure a computer-implemented system for resource usage tracking includes a memory storing instructions and at least one processor configured to execute the instructions. The instructions cause the system to maintain, in a data store, a configuration file associated with a virtual server instance, the configuration file comprising a list of services for loading. The system further determines an efficiency metric associated with an instantiated virtual server and terminates access to the virtual server when the efficiency metric is beneath a threshold. The system also instantiates a new virtual server based on the virtual server instance by locating, in the data store, the configuration file; determining required virtual server resources based on the contents of the configuration file; configuring at least one resource of the virtual server based on the contents of the configuration file; and spinning up the virtual server.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for virtual server management, the system comprising:
 a memory storing instructions; and
 at least one processor configured to execute the instructions to:
  maintain a configuration file associated with a virtual server instance;
  receive a role associated with the virtual server instance;
  determine a required virtual server configuration based on the configuration file and the role;
  spin up at least one virtual server based on the virtual server configuration;
  determine whether the at least one virtual server has reached an error state;
  based on determining that the at least one virtual server has reached an error state, determine whether the at least one virtual server is repairable;
  based on determining that the at least one virtual server is not repairable, terminate access to the at least one virtual server;
  spin up at least a second virtual server based on the virtual server configuration.

2. The system of claim 1, wherein the instructions further cause the processor to:
 based on the determination that a virtual server is not repairable,
  determine a configuration file associated with the virtual server; and
  spin up a new virtual server based on the determined configuration file.

3. The system of claim 1, wherein the instructions further cause the processor to:
 determine an efficiency metric associated with a virtual server;
 terminate access to the virtual server when the efficiency metric is beneath a threshold;
 determine a configuration file associated with the virtual server; and
 spin up a new virtual server based on the determined configuration file.

4. The system of claim 1, wherein the virtual server configuration comprises one or more of cache memory, storage memory, processing time, processing capacity, or network capacity.

5. The system of claim 1, wherein the configuration file associated with the virtual server instance includes a list of storage volumes for mounting.

6. The system of claim 1, wherein the configuration file associated with the virtual server instance includes a list of services for loading.

7. The system of claim 1, wherein the configuration file associated with the virtual server instance includes a list of virtual server requirements for storage and network resources.

8. The system of claim 1, wherein the instructions further cause the processor to:
 configure the virtual server to associate the role with at least one resource of the virtual server;
 modify a database to include an identifier associated with the virtual server and an identifier of the role;
 receive a plurality of indications of resource usage cost associated with the identifier of the role;
 calculate a total cost of the received indications; and
 store, in a data store, the calculated total cost for the role.

9. The system of claim 8, wherein the identifier associated with the virtual server is an IP address.

10. The system of claim 8, wherein the plurality of indications are provided by an Application Programming Interface (API).

11. A computer-implemented method for virtual server management, the method comprising:
 maintaining a configuration file associated with a virtual server instance;
 receiving a role associated with the virtual server instance;
 determining a required virtual server configuration based on the configuration file and the role;
 spinning up at least one virtual server based on the virtual server configuration;
 determining whether the at least one virtual server has reached an error state;
 based on determining that the at least one virtual server has reached an error state, determining whether the at least one virtual server is repairable;
 based on determining that the at least one virtual server is not repairable, terminating access to the at least one virtual server;
 spinning up at least a second virtual server based on the virtual server configuration.

12. The method of claim 11, further comprising:
 based on the determination a virtual server is not repairable,
  determine a configuration file associated with the virtual server; and
  spin up a new virtual server based on the determined configuration file.

13. The method of claim 11, further comprising:
 determining an efficiency metric associated with a virtual server;
 terminating access to the virtual server when the efficiency metric is beneath a threshold;
 determining a configuration file associated with the virtual server; and
 spinning up a new virtual server based on the determined configuration file.

14. The method of claim 11, wherein the virtual server configuration comprises one or more of cache memory, storage memory, processing time, processing capacity, or network capacity.

15. The method of claim 11, wherein the configuration file associated with the virtual server instance includes a list of storage volumes for mounting.

16. The method of claim 11, wherein the configuration file associated with the virtual server instance includes a list of services for loading.

17. The method of claim 11, wherein the configuration file associated with the virtual server instance includes a list of virtual server requirements for storage and network resources.

18. The method of claim 11, further comprising:
 configuring the virtual server to associate the role with at least one resource of the virtual server;
 modifying a database to include an identifier associated with the virtual server and an identifier of the role;

receiving a plurality of indications of resource usage cost associated with the identifier of the role;

calculating a total cost of the received indications; and storing, in a data store, the calculated total cost for the role.

19. The method of claim 18, wherein the identifier associated with the virtual server is an IP address.

20. The method of claim 18, wherein the plurality of indications are provided by an Application Programming Interface (API).

* * * * *